Patented Jan. 8, 1935

1,986,866

UNITED STATES PATENT OFFICE 1,986,866

METHOD OF ISOLATING GLAND EXTRACTS

Richard I. Wagner, New York, N. Y., assignor to The Chemical Foundation, Incorporated, a corporation of Delaware No Drawing. Application October 15, 1932,
Serial No. 637,989

2 Claims. (Cl. 167—74)

This invention relates to an improved process for the preparation of extract of hormones of the kidney.

My present invention has for its objects the production of a hormone extract of the kidney in a superior state of purity to any hitherto obtainable. I attain this object by an improvement in methods applicable to the isolation of the hormones of the kidney, inasmuch as with this improved method most of the coloring matter of the kidney-derived material and several of the other impurities such as inorganic salts are thereby removed, whereby there is attainable a notably purer and more concentrated extract of the active principle. Furthermore, the period necessary for the preparation of such extract is materially reduced; and the physiological and therapeutic value of the resultant product, due to its purity, is materially increased. For example, the isolation of the hormones of the kidney according to any other method heretofore practiced, so far as known to me, requires a period of substantially eight days; whereas, by my newly discovered process, the period requisite for its completed practice, other things being equal, is not more than one-half of that required by the most expeditious method heretofore known.

My improved process comprises the following general steps:

1. Extraction of the finely ground fresh or frozen kidney with acidified alcohol;
2. Filtration of this extract;
3. Precipitation of the filtrate by a precipitant such as calcium carbonate;
4. Refrigeration of this mixture at a temperature approximating but below zero centigrade, and maintaining it at that temperature for about 24 hours;
5. Removal of the precipitant;
6. Concentration of the filtrate;
7. Dilution of this concentrate, until the insolubles form a precipitate, with filtered water;
8. Addition of a salt such as calcium carbonate as a neutralizer and a precipitant for fatty acids and other acids forming insoluble salts with calcium, and furthermore as a buffer substance to maintain a constant pH;
9. Cooling the mixture to a temperature approximating but above zero centigrade, and maintaining it at that temperature for 12 hours;
10. Filtration of the watery mixture;
11. Concentration thereof in vacuo as before;
12. Addition of powdered charcoal to this concentrate sufficient to remove the brown coloring matter and to obtain a slightly pinkish filtrate after 20 minutes of agitation;
13. Agitation of the mixture;
14. Removal of the charcoal;
15. Addition of two volumes of alcohol to the filtrate;
16. Refrigeration of this mixture to a temperature below zero centigrade;
17. Ultra filtration;
18. Removal of alcohol, as by means of concentration in vacuo;
19. Physiological standardization against adrenalin and/or pituitrin in the usual manner.
20. Addition of a preservant.

The details and particulars of these general steps are set forth in the following example of the preferred practice of such improved process:

*First.*—After the capsule and fat are stripped from the kidney, the kidney substance remaining is finely ground. This may be either fresh substance or substance frozen while fresh. To 500 grams of this material are added about three volumes (about two liters) of 95 per cent. ethyl alcohol (or such volume of more or less highly concentrated alcohol as may correspond thereto), acidified by the addition of sulphuric acid in amount sufficient to bring the solution to a pH of 3.5. The resulting extraction is allowed to proceed for about twenty-four hours, with frequent agitation of the solution.

*Second.*—The extract is filtered through a coarse filter and then through filter paper.

*Third.*—The acids in the resulting filtrate are then precipitated, preferably by the addition of a precipitant such as calcium carbonate, the mixture being thoroughly agitated; other salts than those of calcium may be used as precipitants provided they can be ultimately eliminated or their traces rendered physiologically inactive.

*Fourth.*—This mixture is next refrigerated to a temperature approximating −5° C. and maintained at that temperature for about 24 hours.

*Fifth.*—The calcium carbonate is now removed by a separator, centrifuge or, preferably, by filtration through filter paper containing a layer of precipitated calcium carbonate, thereby eliminating the proteins, fatty-acids, aminoacids, and the like, which adsorb upon the calcium salts.

*Sixth.*—The filtrate is then concentrated in vacuo at a temperature between 20–25° C. to a syrupy consistency and volume of about 100 c. c.

*Seventh.*—Dilute this concentrate with approximately three volumes of distilled water or such quantity as suffices to permit the insolubles to form a precipitate upon standing.

*Eighth.*—Add calcium carbonate or other salt adapted to function as a neutralizer and as a precipitant for fatty acids and other acids forming insoluble salts with calcium; and as a buffer substance to maintain a constant pH.

*Ninth.*—Refrigerate the mixture to about +2° C. and maintain it at that temperature for approximately 12 hours.

*Tenth.*—Then filter this watery mixture as before, whereby fatty acids, fats, inorganic salts and other insolubles are removed.

*Eleventh.*—Concentrate in vacuo until the volume is about 100 cc. of syrupy fluid.

*Twelfth.*—Add about 10 grams of finely powdered charcoal or sufficient to remove the brownish coloring matter after agitation for approximately twenty minutes, or long enough to obtain a slightly pinkish filtrate upon subsequent filtration.

*Thirteenth.*—Agitate the fluid mixture for approximately twenty minutes.

*Fourteenth.*—Remove the charcoal by filtration.

*Fifteenth.*—Add two volumes of 75 per cent. alcohol to the filtrate, or a corresponding volume of more or less highly concentrated alcohol.

*Sixteenth.*—Refrigerate this mixture of the watery extract and alcohol to about −5° C.

*Seventeenth.*—Remove any remaining impurities by ultrafiltration.

*Eighteenth.*—Remove the alcohol by concentration of the extract in vacuo to a volume of substantially 25 c. c.

*Ninteenth.*—Standardize the extract physiologically against adrenalin or pituitrin in the usual manner.

*Twentieth.*—Add 0.5 per cent. phenol or other preservative; and finally

*Twenty-first.*—Filter, as through a Berkefeld filter N, to obtain a sterile filtrate; and enclose in sterile containers.

This material contains no coaguable nitrogen, no peptone, aminoacids, adenosinic acid, adenylic acid, histamine or chlorine. The Biuret, Millon, Salkowski, and sulpho-salycilic acid tests are negative. This Pauli test is positive.

By the term "fresh kidney material", as used herein is meant kidney material in which the hormones are present, without substantial deterioration. For example, kidney material which is used immediately after the death of the animal from which it is taken, or which has been immediately preserved either by a preservative such as alconol or by freezing as with carbon dioxide.

By the term "ultrafiltration" as used above, I intend to be understood as indicating colloidal separation, whereby colloids are caused to pass from a state of suspension to a state of precipitation by flocculation; and whereby those inactive high molecular substances, which are present in the crude gland extract as impurities, such as proteins and their higher split products, lipoidal substances, et cetera, in a state of colloidal suspension, are likewise precipitated upon flocculation of the colloid. By such flocculation, all the larger molecular associations are carried down, leaving only small molecules in solution. Whether such precipitation of the impurities is by way of occlusion, i. e. trapping or inclusion within the precipitated mass, or by adsorption, i. e. condensation on the surface of the precipitated particle, or by both, applicant is unable to state.

Having thus described the novel steps of my improved process and the refined product resultant therefrom,

I claim:

1. In the process of isolating a kidney hormone, the steps consisting in preparing an acid-alcoholic extract of finely ground fresh kidney material; treating said extract with soluble calcium salts whereby the fatty acids and other extractive substances of acid character present therein are caused to react with said salts and to form colloidal material which, by flocculation, carries down the inactive high molecular substances present in the said extract as impurities, such as proteins and their higher split products, lipoidal substances, and other like undesirables; cooling the mixture to a temperature of about −5° C., and maintaining same at said temperature during the colloidal separation resultant from precipitation of the insoluble colloidal flocculates.

2. In the process of isolating a kidney hormone, the steps consisting in preparing an acid-alcoholic extract of finely ground fresh kidney material; precipitation of the acid by a salt of the earth alkalis, such as calcium carbonate, which forms an insoluble colloidal precipitate with fatty acids and other lipoids and with proteins and/or other like impurities; cooling the extract to a temperature about but below zero centigrade; removal of the precipitant and adsorbed matter by colloidal separation, removal of the alcohol by concentration of the extract in vacuo to a syrupy consistency at 20–25° C.; dilution of the concentrate with three volumes of distilled water containing a neutralizing salt adapted to precipitate the fatty acids and to produce and maintain a constant pH; cooling the mixture to a temperature about but above zero centigrade; removal of the inorganic salts, precipitates and insolubles by ultrafiltration within the liquid itself; removal of the added water by concentration in vacuo; thoroughly mixing the fluid concentrate with powdered charcoal; filtering out the charcoal and coloring matter adsorbed thereon; dilution of the filtrate with alcohol; refiltration of the mixture; and removal of the alcohol by concentration of the extract in vacuo.

RICHARD I. WAGNER.